United States Patent [19]

Pracht

[11] 4,081,384

[45] Mar. 28, 1978

[54] SOLVENT-FREE CAPSULES AND FABRIC CONDITIONING COMPOSITIONS CONTAINING SAME

[75] Inventor: Hans J. Pracht, Cincinnati, Ohio

[73] Assignee: The Proctor & Gamble Company, Cincinnati, Ohio

[21] Appl. No.: 674,793

[22] Filed: Apr. 8, 1976

Related U.S. Application Data

[62] Division of Ser. No. 597,938, Jul. 21, 1975, abandoned.

[51] Int. Cl.² .......................................... D06M 13/34
[52] U.S. Cl. ...................................... 252/8.8; 8/115.6; 206/.5; 252/316
[58] Field of Search .................. 252/8.6, 8.75, 8.8, 252/8.9, 316; 8/115.6; 206/.5

[56] References Cited

U.S. PATENT DOCUMENTS

| | | | |
|---|---|---|---|
| 3,852,401 | 12/1974 | Suzuki et al. | 252/316 |
| 3,861,870 | 1/1975 | Edwards et al. | 252/8.6 |
| 3,870,542 | 3/1975 | Ida et al. | 252/316 |
| 3,896,033 | 7/1975 | Grimm | 252/8.8 |

*Primary Examiner*—William E. Schultz
*Attorney, Agent, or Firm*—Douglas C. Mohl; Richard C. Witte

[57] ABSTRACT

A substantially organic solvent-free capsule contains an inner core of a fabric antistat/softener material and an outer wall of a polycondensation product formed by interfacial polymerization. A liquid fabric conditioning composition containing the aforementioned capsules possesses desirable softening and antistat properties.

6 Claims, No Drawings

SOLVENT-FREE CAPSULES AND FABRIC CONDITIONING COMPOSITIONS CONTAINING SAME

This is a division of application Ser. No. 597,938 filed July 21, 1975, now abandoned.

BACKGROUND OF THE INVENTION

This invention relates to the production of organic solvent-free capsules containing a fabric antistat/softener material and a process for so producing. The present invention additionally relates to a liquid fabric conditioning composition containing the substantially organic solvent-free capsules.

In the conventional home laundering process, soiled fabrics are subjected to cleaning with a detergent composition in the main wash cycle and rinsing with water in the final cycle. Optionally, during the rinsing cycle a fabric conditioning composition is added. Such compositions contain a fabric softener or fabric antistat material for imparting to the rinsed fabrics' softening and antistat properties. The rinsed fabrics are oftentimes, thereafter, dried in an automatic clothes drier.

A long-standing problem has been how to deliver the fabric conditioning agents during the rinse cycle and have the benefits retained after the drying operation. It is difficult to deliver the fabric conditioning agents to the fabrics from a dilute solution such as is encountered in a rinse cycle. Attempts have been made to improve the efficiency of conditioning agent fabric deposition during the laundering process. For example, U.S. Pat. No. 3,442,692 overcomes the problem of delivery to the fabrics by adding the conditioning agent to the automatic dryer.

Another problem has been the attainment of satisfactory antistat properties on the dried fabrics. A static electric charge develops on fabrics during the tumbling of the fabrics in a clothes drier. Such a charge is objectionable to the consumer because of difficulty it causes in sorting and folding of the dried fabrics. Conventional fabric softener delivered to the fabrics either in the rinse cycle or during the drying operation alleviates the problem of static electricity build up on the fabrics. However, it has been found that when the fabric softener is delivered in the rinse cycle, it hydrates with the water and partly leaves the surface to migrate to the inner portions of the fabric. Since the build up of static electricity occurs across the surface portions of fabrics, the most beneficial use of the fabric softener for antistat benefits would be if it would substantially remain on the surface portions.

Treatment of fabrics after the drying operation has also been attempted. For example, U.S. Pat. No. 3,870,542 teaches the treatment of fibrous articles with a composition containing microcapsules. The microcapsules contain a solvent and a fabric conditioning agent. The treatment process comprises applying the microcapsules to the fabric and thereafter breaking the microcapsules to release the solvent solution onto the fibrous article. Such a process is not conducive to home laundering situations. Moreover, the presence of the solvent causes odor problems and is costly.

It accordingly is an object of this invention to provide a fabric conditioning composition intended for use in a home laundering operation wherein a fabric antistat/softener material can be effectively and efficiently applied to fibrous articles.

Another object of this invention is to provide a liquid fabric conditioning composition adapted to be added during the rinse cycle of the washing process which is capable of providing fabric antistat/softener properties to rinsed fibrous articles.

Still another object of this invention is to provide organic solvent-free capsules containing a fabric antistat/softener material.

These and other objects will become apparent from the description which follows.

As used herein all percentages and ratios are by weight unless otherwise indicated.

SUMMARY OF THE INVENTION

A process for producing capsules substantially free of organic solvent having an outer wall of a polycondensation product and containing as an inner core a fabric antistat/softener material, said capsules having a maximum particle dimension of less than 400 microns, comprising the steps of:

(a) forming a solution of fabric antistat/softener material and a first monomer capable of forming a polycondensation product along an innerface with a second monomer wherein said first monomer is dissolved in said fabric antistat/softener material;

(b) forming an aqueous solution of the second monomer; and (c) adding under agitation the solution of step (a) to the solution of step (b) to form the capsules along the interface of the two solutions wherein a degree of stirring is employed such that the maximum particle dimension of the capsules so formed is less than 400 microns.

A liquid fabric conditioning composition contains the capsules formed by the above described process, water and optionally, dyes, perfumes, etc.

DETAILED DESCRIPTION OF THE INVENTION

In accord with this invention, substantially organic solvent-free capsules containing an inner core of a fabric antistat/softener material and an outer wall of a polycondensation product formed by interfacial polymerization are produced. As used herein, "substantially organic-solvent free" means that the capsules contain less than 25%, preferably less than 10%, organic solvent. Commercial lots of fabric antistat/softener material can contain organic solvents such as isopropanol as an impurity. Preferably there is no organic solvent present since it plays no role in the performance of resultant capsules or in their method of making and can be objectionable because of side reactions with one of the monomers and odor problems. However, levels of organic solvent below 25% are tolerated.

Interfacial polymerization reactions are known. Such reactions involve the irreversible polymerization of two fast-reacting intermediates or monomers near the interface of the two phases of a heterogeneous liquid system. For example, Morgan and Kwolek, "Interfacial Polycondensation. II. Fundamentals of Polymer Formation of Liquid Interfaces", *Journal of Polymer Science*, Vol XL, Pages 299–327, (1959) describes a process wherein a liquid solution of a suitable monomer dissolved in an organic solvent is added to an aqueous solution containing a second monomer. The monomers react to form a polymer at the interface of the two solutions. According to the present invention, interfacial polymerization is used to encapsulate a fabric softener/antistat material.

The fabric antistat/softener materials which form the inner core of the herein described capsules are those water-insoluble (or water-dispersible) cationic and non-ionic organic materials which are generally employed as conventional fabric conditioning agents during the rinsing cycle of the household laundering process. They are organic, waxy materials having a melting (or softening) point between 25° C and 115° C. Such materials possess both fabric softening and fabric antistat properties.

Generally, the cationic nitrogen-containing compounds such as quaternary ammonium compounds and amines have one or two straight-chain organic groups of at least eight carbon atoms. Preferably, they have one or two such groups of from 12 to 22 carbon atoms. Preferred cation-active softener compounds include the quaternary ammonium antistat/softener compounds corresponding to the formula

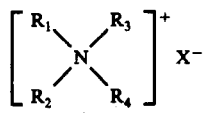

wherein $R_1$ is hydrogen or an aliphatic group of from 1 to 22 carbon atoms; $R_2$ is an aliphatic group having from 12 to 22 carbon atoms; $R_3$ and $R_4$ are each alkyl groups of from 1 to 3 carbon atoms; and X is an anion selected from halogen, acetate, phosphate, nitrate and methyl sulfate radicals.

Because of their excellent softening efficacy and ready availability, preferred cationic antistat/softener compounds of the invention are the dialkyl dimethyl ammonium chlorides, wherein the alkyl groups have from 12 to 22 carbon atoms and are derived from long-chain fatty acids, such as hydrogenated tallow. As employed herein, alkyl is intended as including unsaturated compounds such as are present in alkyl groups derived from naturally occurring fatty oils. The term "tallow" refers to fatty alkyl groups derived from tallow fatty acids. Such fatty acids give rise to quaternary softener compounds wherein $R_1$ and $R_2$ have predominantly from 16 to 18 carbon atoms. The term "coconut" refers to fatty acid groups from coconut oil fatty acids. The coconut-alkyl $R_1$ and $R_2$ groups have from about 8 to about 18 carbon atoms and predominate in $C_{12}$ to $C_{14}$ alkyl groups. Representative examples of quaternary softeners of the invention include tallow trimethyl ammonium chloride; ditallow dimethyl ammonium chloride; ditallow dimethyl ammonium methyl sulfate; dihexadecyl ammonium chloride; di(hydrogenated tallow) dimethyl ammonium chloride; dioctadecyl dimethyl ammonium chloride; dieicosyl dimethyl ammonium chloride; didocosyl dimethyl ammonium chloride; di(hydrogenated tallow) dimethyl ammonium methyl sulfate; dihexadecyl diethyl ammonium chloride; dihexadecyl dimethyl ammonium acetate; ditallow dipropyl ammonium phosphate; ditallow dimethyl ammonium nitrate; di(coconut-alkyl) dimethyl ammonium chloride.

As especially preferred class of quaternary ammonium antistat/softeners of the invention correspond to the formula

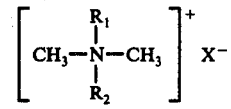

wherein $R_1$ and $R_2$ are each straight chain aliphatic groups of from 12 to 22 carbon atoms and X is halogen, e.g. chloride or methyl sulfate. Especially preferred are ditallow dimethyl ammonium chloride and di(hydrogenated tallow-alkyl) dimethyl ammonium chloride and di(coconut-alkyl) dimethyl ammonium chloride, these compounds being preferred from the standpoint of excellent softening properties and ready availability.

Suitable cation-active amine antistat/softener compounds are the primary, secondary and tertiary amine compounds having at least one straight-chain organic group of from 12 to 22 carbon atoms and 1,3-propylene diamine compounds having a straight-chain organic group of from 12 to 22 carbon atoms. Examples of such softener actives include primary tallow amine; primary hydrogenated-tallow amine; tallow 1,3-propylene diamine; oleyl 1,3-propylene diamine; coconut 1,3-propylene diamine; soya 1,3-propylene diamine and the like.

Other suitable cation-active antistat/softener compounds herein are the quaternary imidazolinium salts. Preferred salts are those conforming to the formula

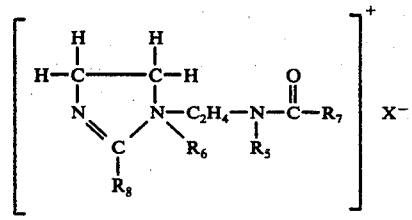

wherein $R_6$ is an alkyl containing from 1 to 4, preferably from 1 to 2 carbon atoms, $R_5$ is an alkyl containing from 1 to 4 carbon atoms or a hydrogen radical, $R_8$ is an alkyl containing from 1 to 22, preferably at least 15 carbon atoms or a hydrogen radical, $R_7$ is an alkyl containing from 8 to 22, preferably at least 15 carbon atoms, and X is an anion, preferably methylsulfate or chloride ions. Other suitable anions include those disclosed with reference to the cationic quaternary ammonium fabric antistat/softeners described hereinbefore. Particularly preferred are those imidazolinium compounds in which both $R_7$ and $R_8$ are alkyls of from 12 to 22 carbon atoms, e.g., 1-methyl-1[(stearoylamide)ethyl]-2-heptadecyl-4,5-dihydroimidazolinium methyl sulfate; 1-methyl-1-[(palmitoylamide)ethyl]-2-octadecyl-4,5-dihydroimidazolinium chloride.

Other cationic quaternary ammonium fabric antistat/softeners, which are useful herein include, for example, alkyl ($C_{12}$ to $C_{22}$)-pyridinium chlorides, alkyl $C_{12}$ to $C_{22}$)-alkyl ($C_1$ to $C_3$)-morpholinium chlorides, and quaternary derivatives of amino acid and amino esters.

Nonionic fabric antistat/softener materials include a wide variety of materials including sorbitan esters, fatty alcohols and their derivatives, diamine compounds and the like. One preferred type of nonionic fabric antistat/softener material comprises the esterified cyclic dehydration products of sorbitol, i.e., sorbitan ester. Sorbitol, itself prepared by catalytic hydrogenation of glucose, can be dehydrated in well-known fashion to form mixtures of cyclic 1,4- and 1,5-sorbitol anhydrides and small amounts of isosorbides. (See Brown; U.S. Pat. No. 2,322,821; issued June 29, 1943) The resulting complex mixtures of cyclic anhydrides of sorbitol are collectively referred to herein as "sorbitan". It will be recognized that this "sorbitan" mixture will also contain some free uncyclized sorbitol.

Sorbitan ester fabric antistat/softener materials useful herein are prepared by esterifying the "sorbitan" mixture with a fatty acyl group in standard fashion, e.g., by reaction with a fatty ($C_{10}$-$C_{24}$) acid or fatty acid halide. The esterification reaction can occur at any of the available hydroxyl groups, and various mono-, di-, etc., esters can be prepared. In fact, complex mixtures of mono-, di-, tri-, and tetra-esters almost always result from such reactions, and the stoichiometric ratios of the reactants can simply be adjusted to favor the desired reaction product.

The foregoing complex mixtures of esterified cyclic dehydration products of sorbitol (and small amounts of esterified sorbitol) are collectively referred to herein as "sorbitan esters". Sorbitan mono- and di-esters of lauric, myristic, palmitic, stearic and behenic acids are particularly useful herein for conditioning the fabrics being treated. Mixed sorbitan esters, e.g., mixtures of the foregoing esters, and mixtures prepared by esterifying sorbitan with fatty acid mixtures such as the mixed tallow and hydrogenated palm oil fatty acids, are useful herein and are economically attractive. Unsaturated $C_{10}$-$C_{18}$ sorbitan esters, e.g., sorbitan mono-oleate, usually are present in such mixtures. It is to be recognized that all sorbitan esters, and mixtures thereof, which are essentially water-insoluble and which have fatty hydrocarbyl "tails", are useful fabric antistat/softener materials in the context of the present invention.

The preferred alkyl sorbitan ester fabric antistat/softener materials herein comprise sorbitan monolaurate, sorbitan monomyristate, sorbitan monopalmitate, sorbitan monostearate, sorbitan monobehenate, sorbitan dilaurate, sorbitan dimyristate, sorbitan dipalmitate, sorbitan distearate, sorbitan dibehenate, and mixtures thereof, the mixed coconutalkyl sorbitan mono- and di-esters and the mixed tallowalkyl sorbitan mono- and di-esters. The tri- and tetra-esters of sorbitan with lauric, myristic, palmitic, stearic and behenic acids, and mixtures thereof, are also useful herein.

Sorbitan esters of the foregoing type are more fully described and exemplified in the copending application of Wahib N. Zaki; Ser. No. 543,607; filed Jan. 23, 1975. This application is incorporated herein by reference.

Another useful type of nonionic fabric antistat/softener material encompasses the substantially water-insoluble compounds chemically classified as fatty alcohols. Mono-ols, di-ols, and poly-ols having the requisite melting points and water-insolubility properties set forth above are useful herein. Such alcohol-type fabric conditioning materials also include the mono- and di-fatty glycerides which contain at least one "free" OH group.

All manner of water-insoluble, high melting alcohols (including mono- and di-glycerides), are useful herein, inasmuch as all such materials are fabric sustantive. Of course, it is desirable to use those materials which are colorless, so as not to alter the color of the fabrics being treated. Toxicologically acceptable materials which are safe for use in contact with skin should be chosen.

A preferred type of unesterified alcohol useful herein includes the higher melting members of the so-called fatty alcohol class. Although once limited to alcohols obtained from natural fats and oils, the term "fatty alcohols" has come to mean those alcohols which correspond to the alcohols obtainable from fats and oils, and all such alcohols can be made by synthetic processes. Fatty alcohols prepared by the mild oxidation of petroleum products are useful herein.

Another type of material which can be classified as an alcohol and which can be employed as the fabric antistat/softener material in the instant invention encompasses various esters of polyhydric alcohols. Such "ester-alcohol" materials which have a melting point within the range recited herein and which are substantially water-insoluble can be employed herein when they contain at least one free hydroxyl group, i.e., when they can be classified chemically as alcohols.

The alcoholic di-esters of glycerol useful herein include both the 1,3-di-glycerides and the 1,2-diglycerides. In particular, di-glycerides containing two $C_8$-$C_{20}$, preferably $C_{10}$-$C_{18}$, alkyl groups in the molecule are useful fabric conditioning agents.

Non-limiting examples of ester-alcohols useful herein include: glycerol-1,2-dilaurate; glycerol-1,3-dilaurate; glycerol-1,2-myristate; glycerol-1,3-dimyristate; glycerol-1,2-dipalmitate; glycerol-1,3-dipalmitate; glycerol-1,2-distearate and glycerol-1,3-distearate. Mixed glycerides available from mixed tallowalkyl fatty acids, i.e., 1,2-ditallowalkyl glycerol and 1,3-ditallowalkyl glycerol, are economically attractive for use herein. The foregoing ester-alcohols are preferred for use herein due to their ready availability from natural fats and oils.

Mono- and di-ether alcohols, especially the $C_{10}$-$C_{18}$ di-ether alcohols having at least one free -OH group, also fall within the definition of alcohols useful as fabric antistat/softener materials herein. The ether-alcohols can be prepared by the classic Williamson ether synthesis. As with the ester-alcohols, the reaction conditions are chosen such that at least one free, unetherified -OH group remains in the molecule.

Ether-alcohols useful herein include glycerol-1,2-dilauryl ether; glycerol-1,3-distearyl ether; and butane tetra-ol-1,2,3-trioctanyl ether.

Yet another type of nonionic fabric conditioning agent useful herein encompasses the substantially water-insoluble (or dispersible) diamine compounds and diamine derivatives. The diamine fabric conditioning agents are selected from the group consisting of particular alkylated or acylated diamine compounds.

Useful diamine compounds have the general formula

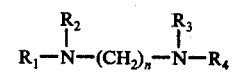

wherein $R_1$ is an alkyl or acyl group containing from about 12 to 20 carbon atoms; $R_2$ and $R_3$ are hydrogen or alkyl of from about 1 to 20 carbon atoms and $R_4$ is hydrogen, $C_{1-20}$ alkyl or $C_{12-20}$ acyl. At least two of $R_2$, $R_3$ and $R_4$ are hydrogen or alkyl containing 1 to 3 carbon atoms, and $n$ is from 2 to 5.

Non-limiting examples of such alkylated diamine compounds include:

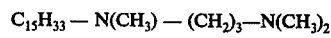

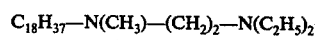

$C_{12}H_{25}-N(CH_3)-(CH_2)_3-HN-C_{12}H_{25}$ $C_{12}H_{25}-N(C_2H_5)-(CH_2)_3-N(C_3H_7)_2$ $R_{\overline{Tallow}}NH-(CH_2)_3-N(C_2H_5)_2$ $C_{20}H_{41}-N(CH_3)-(CH_2)_2-N(CH_3)_2$ $C_{15}H_{31}-N(C_2H_5)-(CH_2)_3-NH_2$ $C_{18}H_{37}-NH-(CH_2)_3-HN-CH_3$ $C_{16}H_{33}-NH-(CH_2)_3-HN-C_{16}H_{33}$ $R_{\overline{Tallow}}N(CH_3)-(CH_2)_3-N(C_2H_5)_2$ $C_{16}H_{33}N(CH_3)-(CH_2)_5-N(C_2H_5)_2$ $C_{12}H_{25}N(C_2H_5)-(CH_2)_2-N(C_3H_7)_2$ and $C_{14}H_{29}N(CH_3)-(CH_2)_3-(CH_3)N-C_8H_{17}$ wherein in the above formulas $R_{Tallow}$ is the alkyl group derived from tallow fatty acid.

Other examples of suitable alkylated diamine compounds include N-tetradecyl, N'-propyl-1,3-propane-diamine, N-eicosyl,N,N',N'-triethyl-1,2-ethane-diamine and N-octadecyl,N,N',N'-tripropyl-1,3-propane-diamine.

Examples of suitable acylated diamine fabric antistat/softener materials include $C_{13-20}$ amido amine derivatives.

The fabric antistat/softeners mentioned above can be used singly or in combination in the practice of the present invention.

The wall constituent of the capsule is a synthetic resin selected from the polyurethanes, polyamides, and polyesters. A polyamide wall constituent is preferred.

The polyurethane resin for the wall constituent is made from toluylene diisocyanate, dimethyl diisocyanate, hexamethylene diisocyanate, xylene diisocyanate, methyl cyclohexane diisocyanate, triphenyl methane diisocyanate or diphenyl methane diisocyanate with a polyvalent amine such as ethylene diamine, hexamethylene diamine, triethyl tetramine, paraphenylene diamine and piperazine, or with a polyvalent hydroxyl compound such as 1,5-dihydroxy naphthalene, pyrogallol, 1,4-butadiene diol, glycerin, resorcin, and bisphenol A.

Polyesters are prepared by reacting a halide of polycarboxylic acid such as phthaloyl chloride, 1,4-cyclohexane dicarbonyl chloride, phosgene, 4,4'-biphenyl dicarbonyl chloride, adipoyl dichloride, sebacoyl chloride and terephthaloyl chloride with a phenolic compound such as resorcin, bisphenol A, 1,5-dihydroxy naphthalene, pyrogallol, phenolphthalein and primary condensation products of phenol resin.

The polyamide is formed by reacting a halide of polycarboxylic acid such as sebacoyl chloride, 4,4'-biphenyl dicarbonyl chloride, phosgene, terephthaloyl dichloride, isophthaloyl dichloride, 1,4-cyclohexane dicarbonyl chloride and adipoyl dichloride with a polyvalent amine such as ethylene diamine, diethylene triamine, hexamethylene diamine, triethylene tetramine, paraphenylene diamine and piperazine.

In accordance with this invention two solutions are initially prepared. One solution contains the fabric antistat/softener material having dissolved therein the isocyanate or polycarboxylic acid halide as the first monomer. In that the fabric antistat/softener materials are normally solid, it is necessary to raise their temperature above their respective melting point prior to dissolving the first monomer therein. The other solution is an aqueous solution of the second monomer. Thus the criteria for the process of this invention is that one of the monomers be water-soluble and -compatible while the other monomer be able to dissolve in the fabric antistat/softener material and be compatible therewith.

The aqueous solution of the second monomer contains from 0.1% to 10%, preferably 0.5% to 5% of the monomer. To this solution is added the solution of the fabric antistat/softener material and first monomer. The solutions are added in amounts such that a ratio of the first monomer to the second monomer falls within the range of 2:1 to 1:1, preferably 1.1:1. Ideally, a 1:1 ratio of the monomers is used; however, an excess of the first monomer is preferred to ensure a complete reaction and the absence of free polyvalent amines and hydroxyl compounds. The ratio of polycondensation product to fabric antistat/softener material is from 0.5:10 to 3:10, preferably 1:10 to 1.5:10.

The fabric antistat/softener-containing solution is added under agitation to the aqueous solution of the second monomer. As the first solution contacts the aqueous solution, capsules are instantly formed at the interface of the two solutions. Formation of the capsules entraps the fabric antistat/softener material as an inner core.

Size of the capsules is dependent upon the degree of agitation. The greater the agitation the smaller the particle size. The capsules of this invention have a maximum particle dimension of less than 400 microns. Preferably the maximum particle dimension of the capsules ranges from 1 micron to 100 microns, more preferably from 20 microns to 60 microns. Capsules having a maximum particle dimension of greater than 100 microns are visible to the naked eye. Deposition of particles greater than 400 microns onto fabrics would be quite noticeable and objectionable. On the other hand capsules having a particle size of less than 1 micron are less effectively entrapped and deposited upon the surface of the fabric. The thickness of the outer wall is dependent on the particular polycondensation product formed; generally the wall thickness ranges from 0.05 microns to 2 microns.

The temperature of reaction of the capsule formation step ranges between room temperature and 70° C. The higher the temperature, the less reaction time necessary to form the desired capsules.

Materials such as dyes, perfumes, humectants, or fillers can be included in either of the reaction solutions without interfering with the process of this invention. Fillers such as clays and inorganic salts are added for controlling the density of the capsules. Preferably the capsules' density is controlled so as to prevent the capsules settling out when added to the hereindescribed liquid fabric conditioning compositions.

Capsules of this invention may be separated from the reaction medium if desired. It has been found that an electrolyte is formed during the polycondensation reaction and, under certain conditions, the presence of the electrolyte, e.g. sodium dichloride, in a liquid fabric conditioning composition is objectionable because of its inverse effect on emulsion stability.

The liquid fabric conditioning compositions of this invention consist essentially of about 0.1% to about 15%, preferably 0.5% to 2.5% of the capsule component with the balance being water. Conventional liquid fabric conditioning composition components may be dissolved or dispersed in the composition. These conventional components include fabric softening agents, for example, clay materials, emulsifiers, thickeners, opacifiers, coloring agents, brighteners, fluorescers, pH adjustment agents and perfume materials. Such optional materials generally comprise about 0.1% to 10% by weight of the composition.

Preferably the liquid fabric conditioning composition of this invention comprises from 1% to 20%, preferably 3% to 7% of cationic fabric antistat/softener material as defined hereinabove which has not been encapsulated. It has been found that the addition of the unencapsulated fabric antistat/softener material aids in the deposition of the encapsulated material onto the fabrics. It is believed that the unencapsulated fabric antistat/softener material surrounds the capsules; accordingly, the positively charged fabric antistat/softener material is attracted to the negatively charged fabrics and carries with it the capsules of this invention.

Use of the liquid fabric conditioning composition of this invention results in the deposition of the capsules on the surfaces of the fabrics being rinsed. When the fabrics are dried in an automatic clothes drier, the wall constituent of the capsules ruptures under the influence of heat and friction thereby releasing the fabric antistat/softener material. As a result of this release on the fabric surfaces and insufficient time to penetrate into the fabric, the dried fabrics have a very satisfactory antistat benefit imparted to them.

The following examples are illustrative of this invention.

EXAMPLE I

Eight grams of terephthalic acid dichloride are dissolved in 64 grams of melted 1-methyl-1-tallowamidoethyl-2-tallowimidazolinium methylsulfate having a temperature of 50° C. The mixture is added slowly to an aqueous solution of 4 grams diethylenetriamine and 4.3 grams potassium hydroxide in 4000 ml. water under gentle stirring. The aqueous solution has a temperature of 70° C. Capsules having a maximum particle size ranging from 20 to 60 microns are formed instantaneously. The capsules containing the imidazolinium fabric antistat/softener as an inner core and a polyamide outer wall as a result of polycondensation reaction between the terephthalic acid dichloride and polyvalent amine give satisfactory antistat control when used in a fabric conditioning composition.

EXAMPLE II

Using the process described in Example I, 64 grams of ditallowdimethylammonium chloride (DTDMAC) are melted and 8 grams of terephthalic acid dichloride are dissolved in it. An aqueous solution of 4 grams resorcin and 4.3 grams potassiumhydroxide is prepared. The DTDMAC solution is added to the slowly stirred aqueous solution to form capsules having maximum particle dimensions ranging from 20 to 50 microns. The capsules have an inner core of DTDMAC fabric antistat/softener and an outer wall of a polyester formed from the terephthalic acid dichloride and resorcin.

EXAMPLE III

Capsules having an inner core of N-tallow, N,N',N'-trimethyl-1,3-propane diamine fabric antistat/softener material and a polyurethane outer wall are produced using the process of this invention. 0.6 grams of hexamethylene diisocyanate are dissolved in 10 grams of the melted diamine and added to a stirred aqueous solution of 200 ml water and 5 grams bisphenol A. The resultant capsules have a maximum particle dimension ranging from 10 to 60 microns.

EXAMPLE IV

The capsules of Example I are tested for antistat control in the following manner. A 5½ lb. test bundle of 53% all-cotton, 12% 65/35 polyester/cotton blend, 17% nylon, and 18% Dacron is washed in a washing machine using a normal 38° C cycle. Forty-five grams of a fabric conditioning composition as indicated below is added in the rinse cycle. The test bundle is dried in a clothes dryer and the process repeated to ensure consistent results. After the second drying, the test bundle is placed in a "Faraday Cage" connected with a volt meter. The bundle is taken out of the cage fabric by fabric and readings are taken at the beginning and after each fabric is removed. The increments are added up and compared versus values obtained from the compositions tested in the same manner as indicated below. Static readings closer to zero are more satisfactory.

| COMPONENT | COMPOSITION | | | | |
|---|---|---|---|---|---|
| | A | B | C | D | E |
| Water | 100% | 94.6% | 93.4% | 92.2% | 94.6% |
| DTDMAC | | 5.2% | 5.2% | 5.2% | — |
| Capsules of Example I | | | 1.2% | 2.4% | 5.2% |
| Perfume and Dye | | Balance | Balance | Balance | Balance |

| COMPOSITION | STATIC READING (Volts) |
|---|---|
| A | 200 |
| B | 50 |
| C | 20 |
| D | 8 |
| E | 25 |

The above results indicate that compositions of this invention, i.e. compositions C, D and E, possess satisfactory antistat control.

What is claimed is:

1. A liquid fabric conditioning composition, consisting essentially of:
   (a) from 0.1% to 15% of substantially organic solvent-free capsules having a maximum particle dimension of less than 400 microns having an inner core of a fabric antistat/softener material and, encapsulating said inner core, an outer wall of a polycondensation product formed by interfacial polycondensation;
   (b) from 1% to 20% of unencapsulated cationic fabric antistat/softener material; and
   (c) the balance water.

2. The composition of claim 1 wherein the maximum particle dimension of the capsules is from 1 micron to 100 microns.

3. The composition of claim 2 wherein the maximum particle dimension of the capsules is from 20 microns to 60 microns.

4. The compositions of claim 1 wherein the polycondensation product is a polyurethane, polyester or polyamide.

5. The composition of claim 4 wherein the polycondensation product is a polyamide.

6. The composition of claim 4 wherein the encapsulated fabric antistat/softener material is a water-insoluble or water-dispersible quaternary ammonium compound, quaternary imidazolinium salt, diamine compound, sorbitan ester, fatty alcohol, fatty alcohol derivative or mixtures thereof.

* * * * *

UNITED STATES PATENT AND TRADEMARK OFFICE
CERTIFICATE OF CORRECTION

PATENT NO. : 4,081,384
DATED : March 28, 1978
INVENTOR(S) : Hans J. Pracht

It is certified that error appears in the above-identified patent and that said Letters Patent are hereby corrected as shown below:

Col. 3, line 56, after "dihexadecyl" and before "ammonium" insert -- dimethyl --.

Col. 4, line 52, "1-methyl-1[(stearoylamide)" etc., should be -- 1-methyl-1-[(stearoylamide) -- etc.

Col. 4, line 58, "$C_{12}$", second occurrence, should be -- $(C_{12}$ --

Col. 8, line 63, "dichloride" should be -- chloride --.

Col. 8, line 65, delete "inverse" and insert therefor -- adverse --.

Signed and Sealed this

Twenty-second Day of August 1978

[SEAL]

Attest:

RUTH C. MASON
Attesting Officer

DONALD W. BANNER
Commissioner of Patents and Trademarks